United States Patent [19]

Miller

[11] Patent Number: 4,906,171
[45] Date of Patent: Mar. 6, 1990

[54] DIRECTED FLOW DIE ASSEMBLY
[75] Inventor: William H. Miller, Wadsworth, Ohio
[73] Assignee: GenCorp Inc., Fairlawn, Ohio
[21] Appl. No.: 207,838
[22] Filed: Jun. 17, 1988
[51] Int. Cl.[4] ...................... B29C 47/24; B29C 47/22
[52] U.S. Cl. .......................... 425/131.1; 264/177.16;
264/209.8; 264/285; 425/145; 425/381;
425/382.3; 425/462; 425/465; 425/466;
425/192 R
[58] Field of Search ...................... 425/131.1, 465, 466,
425/462, 190, 163, 166, 382.3, 467, 380, 381,
145, 146, 461, 192 R; 264/142, 167, 177.16,
209.8, 285, 295, 514

[56] References Cited

U.S. PATENT DOCUMENTS

| | | | |
|---|---|---|---|
| 1,618,256 | 2/1927 | Wuthrich | 425/467 |
| 2,062,338 | 12/1936 | Tanzi | 425/467 |
| 3,080,608 | 3/1963 | Van Riper | 425/466 |
| 3,093,860 | 6/1963 | Eilersen | 425/466 |
| 3,346,918 | 10/1967 | Deleuze et al. | 425/465 |
| 3,425,092 | 2/1969 | Jun Taga | 425/380 |
| 3,564,652 | 2/1971 | Baugnier et al. | 425/532 |
| 3,761,213 | 9/1973 | Wight | 425/465 |
| 4,025,262 | 5/1977 | Furman | 425/145 |
| 4,293,294 | 10/1981 | Rasmussen | 425/382.3 |
| 4,455,133 | 6/1984 | Jakob et al. | 264/167 |
| 4,461,738 | 7/1984 | Russell | 264/167 |
| 4,479,768 | 10/1984 | Kube et al. | 264/142 |
| 4,648,821 | 3/1987 | Thulin | 425/465 |
| 4,761,129 | 8/2988 | Aste et al. | 425/382.3 |

FOREIGN PATENT DOCUMENTS

| | | | |
|---|---|---|---|
| 2359746 | 6/1974 | Fed. Rep. of Germany | 264/295 |
| 49-5903 | 2/1974 | Japan | 425/465 |
| 58-220717 | 12/1983 | Japan | 425/381 |
| 59-188424 | 10/1984 | Japan | 264/209.8 |
| 87-05258 | 9/1987 | PCT Int'l Appl. | 425/11.1 |

Primary Examiner—Jeffery Thurlow
Assistant Examiner—Mathieu Vargot

[57] ABSTRACT

A die assembly is described for causing extrudate to bend without substantially changing the cross sectional shape of the extrudate. The assembly includes a die mounted in spaced relation from a feed channel through which extrudate passes from the extruder, including a first part which has a flow channel which has at least one pair of sidewalls which converge from the die in the direction of the extruder. A second part of the assembly has a feed opening for directing extrudate into the flow channel. It provides for varying the length of the pathways which extrudate flows through the flow channel to a pair of opposing sides of the die to cause bending of the extrudate in the direction of the longest pathway as the extrudate exits the die.

41 Claims, 3 Drawing Sheets

DIRECTED FLOW DIE ASSEMBLY

BACKGROUND OF INVENTION

The invention relates to extrusion, especially the dies that are used in the extrusion process which essentially comprises charging solid extrudable material, such as rubber, to the heat chamber of an extruder, after which the material is heated to a flowable state and forced from the chamber through the opening in a plate or die which is mounted at the discharge end of the heat chamber. The extrudate falls onto a conveyor which removes the extrudate from the extruder which, typically, has a horizontally disposed hollow barrel with a cylindrical bore as a heat chamber. A rotatable screw is disposed in the bore for forcing the heated material through the die at the discharge end of the barrel.

Extruded products, such as rubber automobile and refrigerator door seals are limited to linear extruded formations. The corners of such door seals are presently formed, by hand. For example, the ends of two seals are mitered and held together in a mold, after which similar rubber material is injected into the mold to contact and join the mitered ends to form the corner desired. Removable inserts are placed in hollow sections of the mitered ends, so that the shapes of the seals will not be distorted during the corner forming process which is complex, time consuming and expensive.

The aforementioned door seals can be molded with curved or square corners, but this process is a batch-type process which is much slower than the continuous extrusion process. Moreover, expensive molds are required in the molding process. Thus, it is quicker and easier and less expensive to use the extrusion process, if at all possible.

The extrusion of bends in rubber automobile hose is well known. This is accomplished by eccentrically positioning in the flow channel through which extrudate flows, the cylindrical core or mandrel which is used to form the hollow bore within the hose. The variation in the thickness of the flow pathways along the mandrel, causes the rubber extrudate or hose to bend in the direction of the narrower pathway, or thinner sidewall produced in the hose. Such a process is suitable for extrudates which have a relatively simple shape that is substantially symmetrical about an axis. The aforementioned door seals generally have a complex geometry or shape, so that their formation is incompatible with the hose making process.

A simple, revolutionary way has been discovered to bend or curve a uniform extrudate without radically distorting the shape of the extrudate.

Briefly stated, the invention is in a method and apparatus for substantially varying the length of the pathways which extrudate flows to opposing extremities of a die opening to produce bending or curvature of the extrudate in the direction of the longer pathway.

It has been found that varying the lengths of the flow pathways, rather than the thickness of the pathways, causes the extrudate to bend without substantially changing its cross sectional shape. Thus, the invention has the advantage of producing a more uniform product which does not have any of its sidewalls weakened by a reduction in thickness.

DESCRIPTION OF DRAWING

The following description of the invention will be better understood by having reference to the accompanying drawing, wherein.

DETAILED DESCRIPTION OF THE DRAWING

Figure 1:
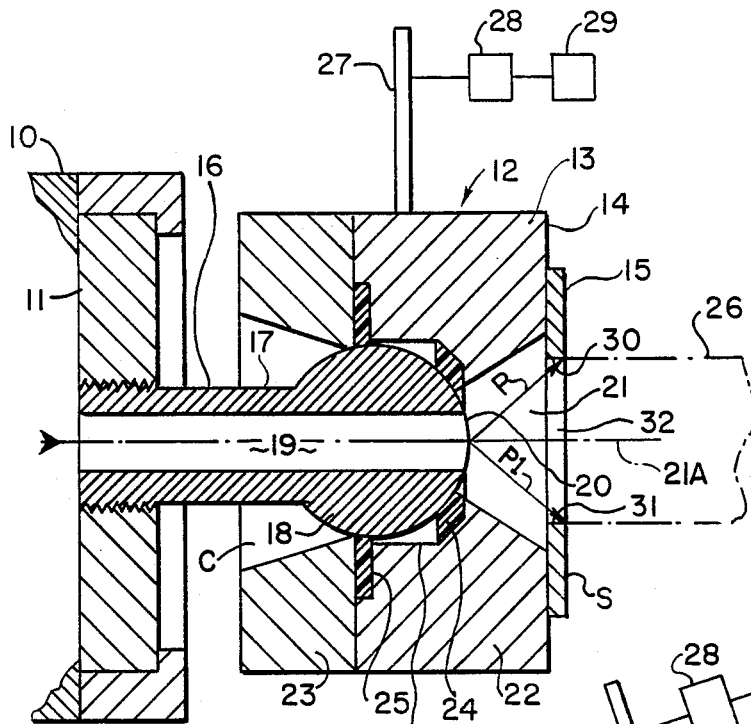
FIG. 1 is a cross section of a die assembly which is made in accordance with the invention, and includes a schematic of components for rotating the die assembly which is shown in an unrotated position.
Figure 2:
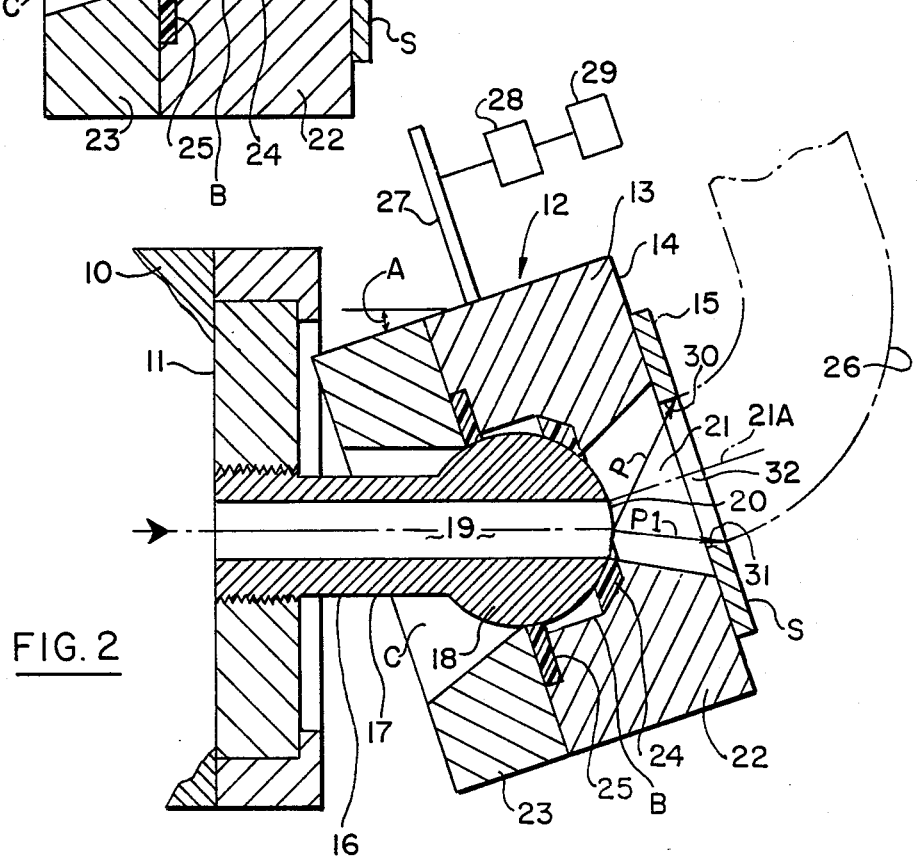
FIG. 2 is a similar cross section showing the die assembly in a rotated position.

With general reference to the drawing for like parts and particular reference to FIGS. 1 and 2, there is shown an extruder 10 with a metal front plate or head 11 to which a metal die assembly 12 is mounted. The die assembly 12 essentially comprises, a swivel socket or die head 13 which has a front face 14 to which any suitable die 15 is fastened, and a stationary ball-type nozzle 16.

The nozzle 16 comprises an elongated cylindrical portion 17 which is threadably secured to the front plate 11 of the extruder 10 and which terminates at a spherical or ball-shaped distal end or tip 18. A cylindrical feed channel or passageway 19 extends longitudinally through the nozzle 16 and terminates at a feed opening 20 at the discharge end of the fixed nozzle 16. Extrudate flows from the extruder 10 through the feed channel 19 and feed opening 20 into a frusto-conically shaped flow channel 21 of the socket 13, the conical sides of the flow channel 21 diverging in a direction away from the feed opening 20. The flow channel 21 having a longitudinal central die axis 21A is conically shaped to accomodate a number of dies while minimizing the dead areas adjacent the front face 14 of the socket 13, and to permit maximum rotation of the socket 13 without blockage of the feed opening 20.

The socket 13 is comprised of two rectangular plates 22, 23 which are bolted together around the ball tip of the nozzle 16. The die 15 is fastened to the outer face 14 of the front plate 22 in which the flow channel 21 is formed. A rearwardly facing frusto-conically shaped cavity C is formed in the back plate 23 in spaced concentric relation with the flow channel 21, to allow the necessary rotation of the socket 13, e.g. angle A of 15 degrees, relative to the longitudinal axis of the feed channel 19. The socket 13 is also rotatable 360 degrees around the feed channel axis. A generally cylindrical bore B is also formed in the front plate 22 in concentric relation with the flow channel 21 and connects the flow channel 21 and rear cavity C. The bore B is also designed to receive a pair of any suitable seals, e.g. parallel, nylon annular seals 24, 25 to prevent the flow of extrudate 26 anywhere but in the flow channel 21.

It can be appreciated that any suitable guide means (not shown) can be provided for limiting rotation of the socket 13 in any desired plane or direction. Further, any appropriate means can be used to rotate the socket 13 in such plane or direction. For example, the socket 13 can be provided with an outstanding arm or handle 27 which a skilled operator can use to rotate the socket 13 to produce the desired bend or curvature in the extrudate 26. For more sophisticated operations, the arm 27 can be coupled to one or more hydraulic actuators 28 which rotate the socket 13 in correlated relation to a pattern or to commands received, for example, from a computer 29 which is programmed to produce the desired product, e.g. a rectangular door seal with curved or rounded corners.

The invention is in varying lengths of the pathways P and P1, along which the extrudate 26 travels through the flow channel 21 and die 15 to opposing extremities, e.g. sides 30, 31, of the opening 32 in the die 15, sufficiently to cause the extrudate 26 to bend as it exits the flow channel 21 and die 15. For example, as seen in FIG. 1, the flow pathways P and P1 to opposing sides 30, 31 of the opening 32 in the die 15, are substantially equal so that the extrudate 26 will pass from the die 15 in a straight line or horizontal plane when the die assembly 12 is horizontal. Notice in FIG. 2 the difference, in length, of the same pathways P and P1 when the socket 13 is rotated upwards from the horizontal, 15 degrees which is sufficient to cause the extrudate to bend upwards towards the longer pathway P and away from the shorter pathway P1 in accordance with the invention.

Figure 3:
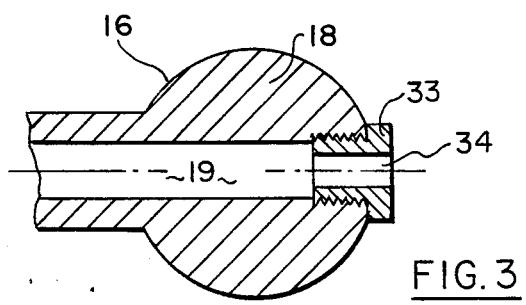
FIG. 3 is a cross section of the ball tip of the die assembly, showing a removable coupling for changing the nozzle through which extrudate flows towards the die.

If necessary, the size of the feed opening 20 or length L (FIG. 9) of the flow channel 21 can be changed by threadably inserting in the feed opening 20, a coupling 33 with or without a smaller diameter feed channel 34, as best seen in FIG. 3.

For the foregoing described embodiment of FIGS. 1 and 2, the die assembly 12 utilized a fixed, ball-type nozzle 16 and a swivel or rotatable socket 13. The following described embodiment employs a fixed socket 13 and a rotatable nozzle 16 to vary the length of the flow pathways P and P1 and achieve bending of the extrudate 26.

Figure 4:
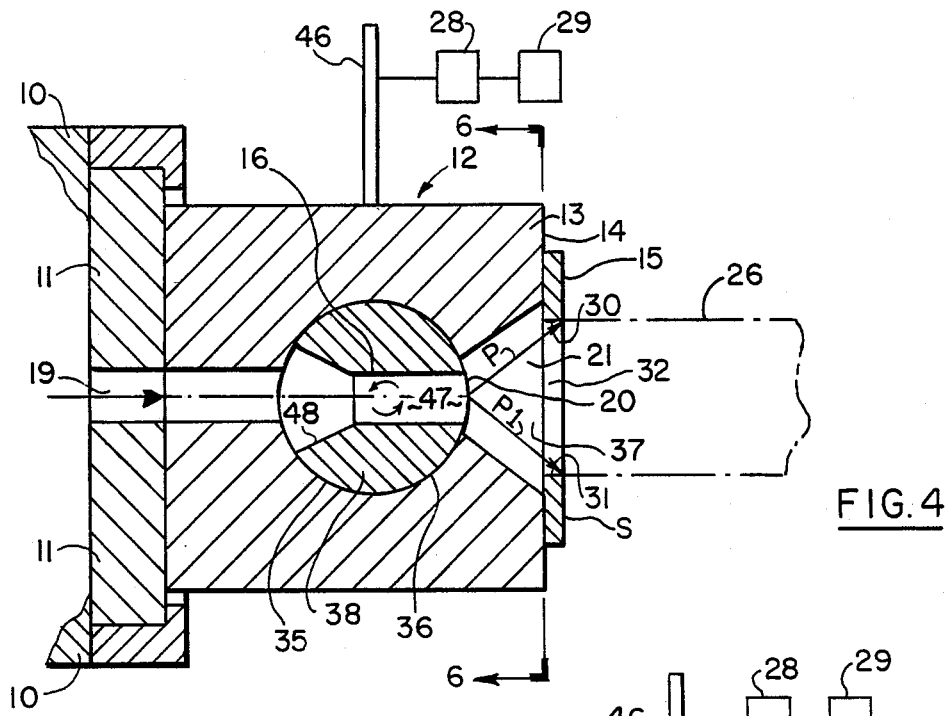
FIG. 4 is a cross section of a second embodiment of the die assembly in an unrotated position as viewed from the line 4—4 of FIG. 6.
Figure 5:
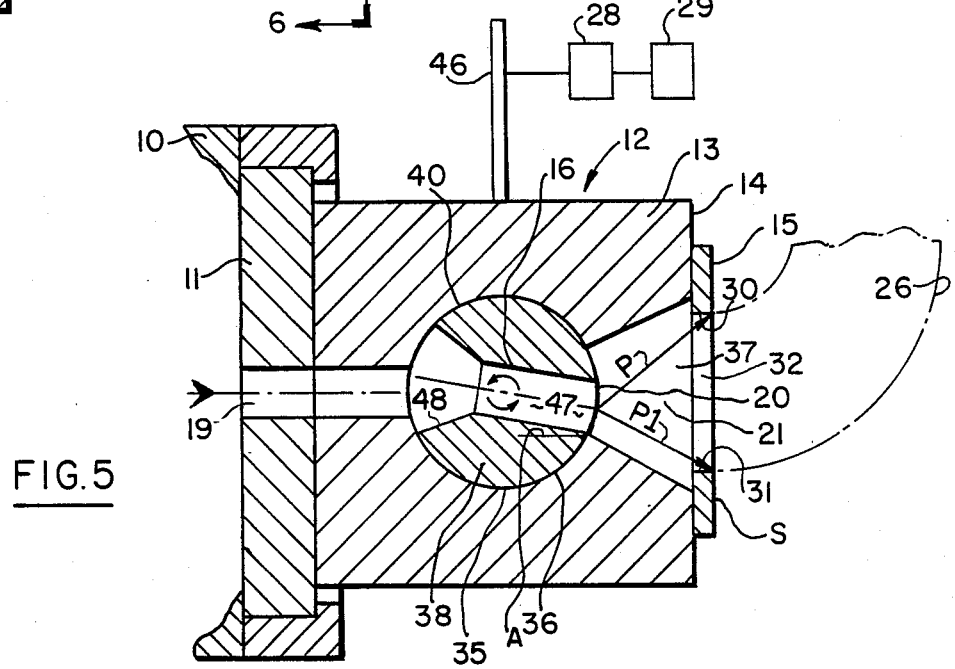
FIG. 5 is a similar cross section of the second embodiment, showing the die assembly in a rotated position.
Figure 6:
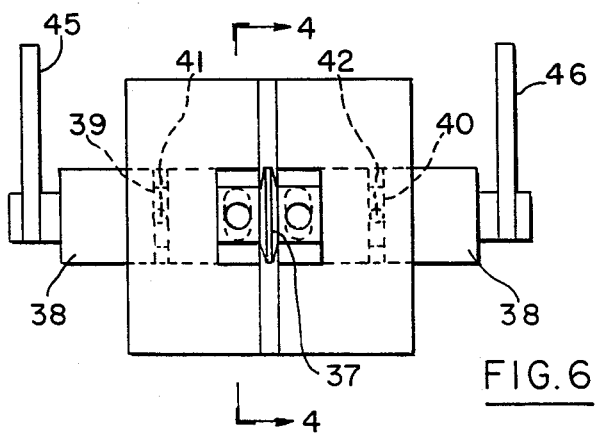
FIG. 6 is a front view of the second embodiment of the die assembly as seen from the line 6—6 of FIG. 4.

With reference to FIGS. 4–6, the socket 13 of the die assembly 12 is a solid, stationary block which is secured to the front extruder plate 11, while the nozzle 16 is rotatable within a bushing 35 that lines a cylindrical bore 36 which is disposed crosswise in the socket 13, i.e. the longitudinal axis of the bore 36 is normal to the longitudinal axis of the feed channel 19 which is now located in the socket 13 in axial spaced relation from the flow channel 21 which is just behind the die 15. Thus, the nozzle 16 and not the socket 13, rotates in a vertical plane about a horizontal axis when the die assembly 12 is properly positioned on the extruder 10.

In this particular instance, the die assembly 12 is designed for dual extrusion of, for example, two extrudates of different materials. Accordingly, the die assembly 12 is provided with two separated feed channels 19 that are in communication with two axially spaced similarly shaped and separated flow channels 21 via twin nozzles 16 that can be mounted for selective rotation, or unitary rotation, depending on the result desired. The twin flow channels 21 flare outwardly towards the die 15 and are side-by-side, being separated by a vertically disposed divider plate 37 which is tapered to bring the two extrudates together as they enter the die opening 32.

The twin nozzles 16 are formed in transverse, parallel relation in a solid cylinder 38 which is mounted in the bushing 35 for rotation about the longitudinal axis of the bore 36. A pair of annular recesses 39, 40 are formed in the cylinder 38 to receive any suitable means, e.g. set screws 41, 42, coacting with the fixed socket 13, to prevent axial movement of the cylinder 38 and maintain it in position within the bore 36 of the fixed socket 13, especially if the cylinder 38 is equally split longitudinally to allow selective rotation of the twin nozzles 16. In such case, the split cylinders and nozzles 16 would be provided with separate handles 45, 46 for rotating the twin nozzles 16 separately or, in unison, if desired. The twin handles 45, 46 can be operated manually, or as previously mentioned, operatively coupled to hydraulic actuators 28 and computer 29. The twin nozzles 16 each include an elongated, cylindrical discharge passageway 47 which terminates at the feed opening 20 or entry into the flow channel 21, and a rearwardly flaring intake opening 48 which confronts the feed channel 19. The intake openings 48 are flared to accommodate rotation of the nozzles 16, i.e. to maintain the feed channels 19 and flow channels 21 in communication during rotation of the twin nozzles 16.

Figure 7:
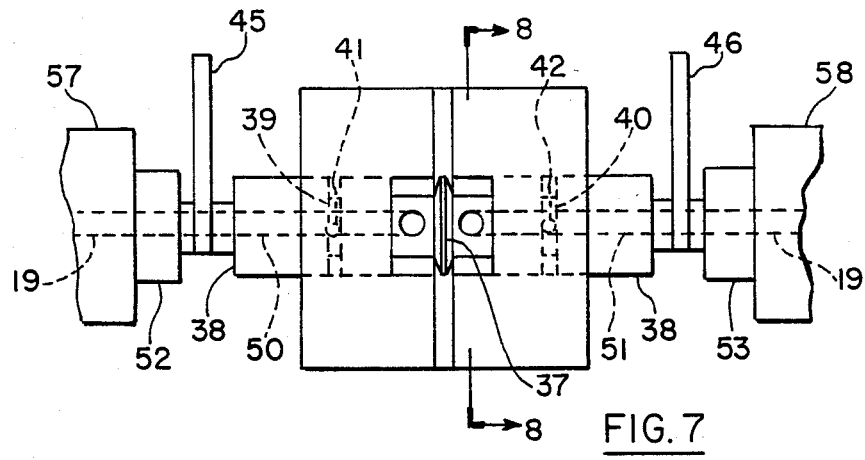
FIG. 7 is similar to FIG. 6, but of a different embodiment of the die assembly.
Figure 8:
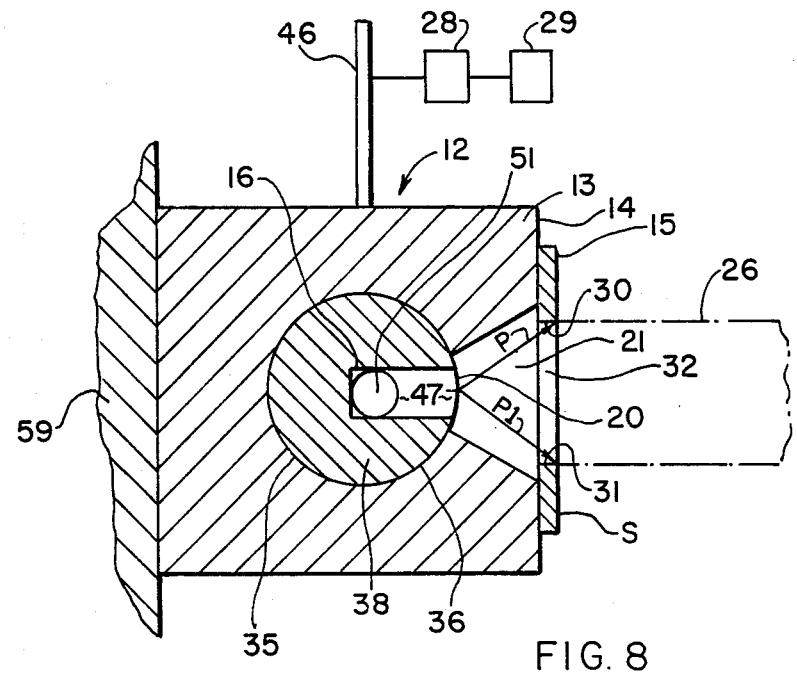
FIG. 8 is a section viewed from the line 8—8 of FIG. 7.

With reference to FIG. 7 and 8, the single or twin cylinders 38 are provided with a pair of centrally disposed, axially spaced, bores or feed channels 50, 51 which communicate with the associated twin discharge passageways 47 in place of the twin feed channels 19 and flared intake opening 48 of the previously described embodiment. A pair of rotatable collars 52, 53 are provided between the exposed outer ends of the twin cylinders 38 and a pair of confronting, stationary extruders 57, 58 so that the single or twin nozzles 16 can be rotated relative to the extruders 57, 58 and the socket 13 which is mounted in stationary relation to the rotatable nozzles 16 by any suitable means, e.g. framework 59 which can be mounted between the extruders 57, 58 or on a floor on which the extruders are mounted.

Alternately, any suitable means can be used to mount a socket 13 and nozzle 16 of FIGS. 7 and 8 on an extruder, so that they can be rotated together, or the nozzle 16 can be rotated independently of the socket 13. This particular combination is beneficial when the socket 13 and nozzle 16 are adapted to rotate in a horizontal plane to produce, for example, a rectangular door seal which can be conveniently deposited on a horizontally moving conveyer as the seal is formed.

The aforementioned die assemblies 12 can be advantageously used to correct unwanted curvature in an extrudate caused by imperfections in the die or complex cross-sections of the extrudate. For example, the tendency of an extrudate to curve downwards from the horizontal could be compensated for by rotating the die 15 upwards to a correcting position, as shown in FIG. 2.

Further, it has been found that holding the die assemblies 12 in a rotated position for a period of time causes the extrudate to coil like a spring. This is useful in winding strips around spherical or conically shaped mandrels, such as the winding of rocket insulation around the cap of a closed pressure vessel. At present, it is necessary for the strips to stretch and overlap in the region of the spherical caps. The die assemblies 12 can be programmed to produce a continuously varying radius of curvature to facilitate the winding of a hemispherical cap or other curved surface. These and other advantages of the invention will become apparent from the following technical discussion of the invention.

The extrudate velocities at different locations on the face of the die 15 vary inversely with the lengths of their flow pathways. In FIG. 2, the higher velocity at die opening side 31, relative to die opening side 30, results from the shorter flow pathway P1 relative to the longer flow pathway P. This difference in velocity at the die opening results in either a curved extrudate or local stretching and/or buckling, if the extrudate is restrained from curving.

Generally, velocities through local regions of the die opening 32, such as at sides 30 or 31, vary inversely with the corresponding total resistances to flow between the outer surface S of the die 15 and the feed opening 20 of the nozzle 16. The total resistance is the sum of the resistance to flow through the flow channel 21 and the resistance to flow through the die opening 32. Accordingly, the ability of the die assembly 12 in FIG. 2 to produce curved extrudate, is related to the ability of the die assembly to change the ratio of the total flow resistance along the shorter flow pathway P1 to the total flow resistance along the longer flow pathway P.

It is important to keep the resistance to flow through the opening 32 of the die 15 as low as possible, because low resistance increases the effectiveness of the die assembly 12 in bending extrudate. This can be accomplished, for example, by decreasing the thickness of the die 15 and/or tapering the opening 32 of the die 15, so that the opening of the rear face of the die, closest the flow channel 21, is larger than the opening at the outer exposed front face of the die farthest from the flow channel 21.

The geometry of a die assembly should be designed to give the following three performance characteristics:

I. The die assembly should be able to produce bends in the extrudate with any desired angle and radius of curvature ranging from an acute enclosed angle (less than 90°) with a small radius of curvature, e.g. 1 inch, to long straight sections in order to produce presently known geometric shapes.

II. The ratio of the flow pathway length leading to a particular location on the rotated die to the corresponding flow pathway length for the unrotated or neutral die should change monotonically (no local maxima or minima) across the face of the die. Accordingly, the velocity exiting the rotated die, relative to the corresponding velocity of the extrudate for the unrotated die, should have no maximum or minimum across the face of the die in order to produce a curved extrudate with minimal stretching or buckling and/or change in cross sectional shape of the extrudate. Ideally the velocity should vary linearly across the face of the die.

III. The ratio of the longer to the shorter flow pathway lengths (P/P1) for any pair of extrudate sections emerging equidistant from the center of the die should increase with increasing rotation angle A of the die to insure that increasing the angle A of rotation will not result in a decrease in curvature of the extrudate.

Figure 9:
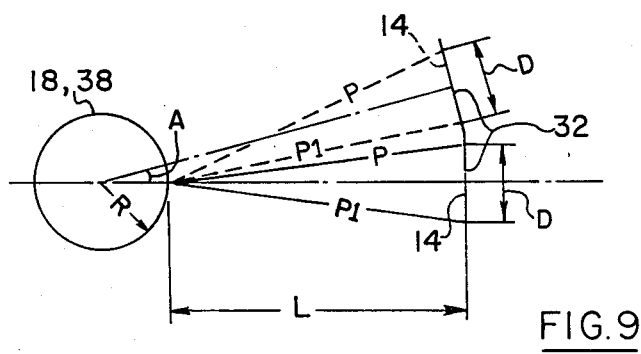
FIG. 9 is a schematic of certain geometric variables of the different die assemblies.

A geometric analysis of the invention based on FIG. 9 indicates that, as to characteristic I above, the ability of the die assembly to bend extrudate for a given D/R value increases as the ratio L/R decreases, L being the length of the flow channel 21, measured axially along the channel between the feed opening 20 and the die 15 when the die is unrotated or in the neutral position (FIGS. 1 and 4), D being the maximum distance across the opening 32 of the die, e.g. the distance between sides 30, 31 of FIG. 1, and R being the radius of the ball-shaped tip 18 (FIG. 1), or of the cylinder 38 (FIG. 4). See FIG. 9 also.

Further, the analysis indicates that characteristic II is better satisfied as the ratio of D/2L decreases, L being the length of the flow channel 21. The analysis shows the preferable range of D/2L values decreases as the ratio L/R decreases and as the angle A increases.

To satisfy characteristic III, the analysis indicates that each value of L/R has associated with it a preferable range of rotation angles A for which the ratio of the lengths of the flow pathways (P/P1) increases with increasing rotation angle A. The preferable range of angle A decreases with decreasing L/R ratio.

It is apparent from the foregoing analysis that the design of directed flow die assemblies involves tradeoffs between the effectiveness of the assembly in inducing curvature (characteristic I), the preservation of extrudate cross section (characteristic II), and increasing curvature with increasing rotation angle (characteristic III), because characteristic I is accomplished by lowering the L/R ratio, whereas characteristics II and III place increasing restrictions on i) the rotation angle A as L/R is decreased, and ii) the die opening width ratio D/2L as L/R and A are decreased.

The included angle between adjacent straight sections between which the corner is formed and the radius of curvature of the corner or the roundness of extruded corner are functions of the rotation angle A and time. For example, using the die assembly 12 of FIG. 1, a 90° bend or corner with a small uniform radius of curvature is formed by rotating the socket 13 fifteen degrees from the neutral position of FIG. 1 as quickly as possible, leaving it in the rotated position for a short period of time, and then rotating it back to the neutral position as quickly as possible. The same 90° bend with a larger radius of curvature is formed by rotating the socket 13 quickly five degrees from the neutral position, holding the socket 13 in the rotated position for a period of time sufficient to form the 90° bend or corner, and then rotating the socket back quickly.

A coiled spring-like extrudate is formed by holding the socket 13 in the rotated position for a longer period of time, the tightness of the coils being dependent on the angle A at which socket 13 is initially rotated. It can be appreciated that an extrudate with a compound curvature can be formed by varying the rotational angle A of the socket 13 uniformly or otherwise over a period of time.

Thus, there has been described a unique die assembly for placing bends in an extrudate without adversely distorting the cross sectional space of the extrudate as it is being bent or curved. The complexity of the geometric shape of the extrudate seems to present no particular problem in the bending of the extrudate using the die assembly. The simplicity of design makes the die assembly readily adaptable to meet continuous extrusion devices and obviates the need for more expensive and time consuming molding operations.

The foregoing parameters of the invention have been described, so that a die assembly of the invention can be designed for use with a particular die now being used in production. It is believed that any modifications or additions to the invention should be readily apparent from the above description.

What is claimed is:

1. A die assembly used in connection with an extruder for bending extrudate as it flows from the assembly, comprising:
   (a) a die and means for mounting said die spaced from a feed opening of the assembly to form a flow channel therebetween, the die having a die opening which is positioned such that extrudate flows from an extruder successively through the feed opening, flow channel and the die opening, and
   (b) means for angularly moving the die opening with respect to the feed opening of the assembly for varying the length of the flow channel to variably direct the flow of the extrudate along pathways of varying length through the flow channel to bend the extrudate as it exits the die opening.

2. The die assembly of claim 1 further comprising a first part including the die mounting means, and a second part including a portion of a feed channel supplying extrudate from an extruder.

3. The die assembly of claim 2, wherein the first part includes the flow channel, and the means for varying the length of the flow channel includes
   means mounting the first and second parts for relative angular movement.

4. The die assembly of claim 3, wherein the flow channel diverges from the feed opening in the direction of the die mounted on the first part.

5. The die assembly of claim 5, wherein the length of the flow channel between the feed opening and die opening is such that the lengths of pathways can be varied sufficiently to bend the extrudate.

6. The die assembly of claim 5, wherein the level of fluid pressure in the flow channel does not adversely affect the bending of the extrudate due to the diameter of the feed opening of the second part in relation to the diameter of the die opening.

7. The die assembly of claim 5, wherein the die opening of the die, mounted on the first part, is at least equal, in size, to the feed opening.

8. The die assembly of claim 5, wherein the second part is fixed in relation to the first part which is angularly movable.

9. The die assembly of claim 8, which includes means for securing the second part to the extruder, the second part having a cylindrical portion extending from the extruder and terminating at a ball-shaped distal end, and said feed channel of said second part extends longitudinally of the cylindrical portion and terminates at the feed opening at the distal end, and the part mounting means includes means mounting the first part on the ball-shaped distal end for rotation relative to a longitudinal axis of the feed channel.

10. The die assembly of claim 9, which includes means coacting between the first part and ball-shaped distal end of the second part for sealing the space between the first part and distal end of the second part to prevent extrudate from leaving the flow channel other than through said die mounted on the first part.

11. The die assembly of claim 10 wherein the first part includes a cavity coaxially spaced from the flow channel and which extends rearwardly of the ball-shaped distal end in a direction away from the flow channel and die mounted on the first part, the cavity diverging in a direction away from the ball-shaped distal end and flow channel to allow predetermined rotation of the first part and die mounted thereon.

12. The die assembly of claim 11, which includes means for rotating the first part in correlated relation to a bend desired to be placed in the extrudate as it exits the die opening.

13. The die assembly of claim 12 having sealing means comprising a first annular seal carried by the first part for compressively engaging the distal end of the second part adjacent the feed opening, and a second annular seal carried by the first part for compressively engaging the ball-shaped distal end of the second part in parallel relation from the first seal.

14. The die assembly of claim 12, which includes means for varying the size of the feed opening.

15. The die assembly of claim 5, wherein the first part is fixed in relation to the second part which is movable.

16. The die assembly of claim 15, which includes, means for securing the first part to the extruder and means mounting the second part on the first part for rotation about an axis which is normal to a longitudinal axis of the flow channel.

17. The die assembly of claim 16, wherein the first part includes:
   (I) a cylindrical bore which extends longitudinally of the first part at right angles to the longitudinal axis of the flow channel;
   (II) said feed channel located between the extruder and bore, the longitudinal axes of the feed channel and bore being normal to each other, the feed channel and flow channel being coaxially spaced on opposite sides of the bore; and the second part includes;
   (III) an elongated cylinder rotatable in the bore, the cylinder having a discharge passageway which extends transversely through the cylinder for placing the feed channel and flow channel in communication, the passageway including the feed opening adjacent the flow channel.

18. The die assembly of claim 17, wherein the discharge passageway, closest the feed channel, diverges from the feed opening in a direction away from the flow channel.

19. The die assembly of claim 18, wherein the parts mounting means includes means mounting the cylinder in the bore for rotation around the longitudinal axis of the bore such that the discharge passageway rotates in a plane normal to the longitudinal axis of the bore.

20. The die assembly of claim 19, wherein the first part includes
   flow channels and parallel spaced feed channels through which different extrudates can flow, the flow channels being designed to keep the extrudates separated until they enter the die opening mounted on the first part in covering relation over the flow channels; and the second part includes
   parallel spaced discharge passageways for placing the flow channels and associated feed channels in communication with each other.

21. The die assembly of claim 20, which includes means coacting with the cylinder for rotating the discharge passageways, in unison.

22. The die assembly of claim 20, which includes means coacting with the cylinder for selectively rotating the discharge passageways in correlated relation.

23. The die assembly of claim 16, wherein the first part includes:
   (I) A cylindrical bore which extends longitudinally of the first part at right angles to the longitudinal axis of the flow channel; and the second part includes:
   (II) an elongated cylinder rotatable in the bore, the cylinder having, (i) a feed channel extending longitudinally of the cylinder for receiving extrudate from an extruder, and (ii) a discharge passageway which extends transversely of the cylinder in communication with the feed channel and which terminates at a feed opening which communicates with the flow channel in the first part, the discharge passageway and feed channel being in angular relation within the second part.

24. The die assembly of claim 23, wherein the parts mounting means includes means mounting the cylinder in the bore for rotation around the longitudinal axis of the bore such that the discharge passageway rotates in a plane normal to the longitudinal axis of the bore.

25. The die assembly of claim 24, wherein the first part includes
  parallel spaced flow channels designed to keep different extrudes flowing through them separated until the extrudates pass therefrom into the opening of a die mounted on the first part in covering relation over the flow channels; and the second part includes
  feed channels and parallel spaced discharge passageways, the feed channels being in end-to-end axial spaced relation, and the discharge passageways for transporting to the flow channels, different extrudates from different extruders.

26. The die assembly of claim 25, which includes means coacting with the cylinder for rotating the discharge passageways and associated feed channel, in unison.

27. The die assembly of claim 25, which includes means coacting with the cylinder for selectively rotating the discharge passageways and associated feed channel in correlated relation.

28. A die assembly used in conjunction with an extruder for bending extrudate as it flows from an opening in a die mounted on the assembly, comprising:
  (a) a nozzle secured to an extruder and extending therefrom, the nozzle including:
    (I) an elongated cylindrical portion terminating at a ball-shaped distal end portion spaced from the extruder, the portions having a centrally disposed feed channel which extends longitudinally of the portions and terminates at a feed opening in the distal end portion, the feed channel designed to receive extrudate from the extruder;
  (b) means for mounting the elongated cylindrical portion on the extruder;
  (c) a socket mounted on the ball-shaped distal end portion of the nozzle, the socket including;
    (II) a pair of oppositely disposed, coaxially spaced frusto-conically shaped openings extending inwardly of the socket from opposing parallel faces thereof, the conically sloped sides of the openings converging towards each other and the feed opening in the distal end of the nozzle, the openings being connected by a centrally disposed bore in the socket, the opening of the socket farthest from the extruder being the flow channel into which extrudate flows as it exits the feed opening;
  (d) a pair of annular seals coacting between the bore of the socket and the ball-shaped distal end portion of the nozzle for sealing space between them and preventing the flow of extrudate from the feed opening anywhere but in the flow channel;
  (e) means for mounting a die on the socket in covering relation with the flow channel, the die having an opening communicating with the flow channel;
  (f) means for mounting the socket on the ball-shaped distal portion for rotation relative to the longitudinal axis of the feed channel; and
  (g) means for rotating the socket to vary the length of a pathway along which extrudate flows through the flow channel and die opening to correspondingly bend extrudate as the extrudate exits the die assembly.

29. A die assembly used in conjunction with an extruder for bending extrudate as it flows from an opening in a die mounted on the assembly, comprising:
  (a) a socket secured to the extruder and having a generally frusto-conically shaped flow channel which converges inwardly of the socket from a die when the die is mounted on the socket, the socket having a longitudinally extending bore which is normal to a longitudinal axis of the flow channel;
  (b) a nozzle for directing the flow of extrudate into the flow channel, the nozzle including a cylinder mounted in the bore of the socket for rotation around the longitudinal axis of the bore, the cylinder having a discharge passageway which is normal to a longitudinal axis of the bore, the discharge passageway terminating at a feed opening which communicates with the flow channel, the discharge passageway and flow channel being coaxially aligned when the nozzle is in a neutral, unrotated position;
  (c) means for transporting extrudate from the extruder to the discharge passageway;
  (d) means for mounting a die in covering relation over the flow channel, the die having an opening in coaxial alignment with the flow channel; and
  (e) means for rotating the nozzle to vary the length of the pathway along which extrudate flows through the flow channel and die opening to correspondingly bend extrudate as the extrudate exits the die assembly.

30. The die assembly of claim 29, wherein the means for transporting extrudate includes a feed channel in the socket between the extruder and bore in coaxial alignment with the flow channel leading from the opposite side of the bore, the discharge passageway extending transversely through the cylinder for directing the flow of extrudate from the feed channel into the flow channel, the discharge passageway adjacent the feed channel including a flared portion diverging from the feed opening in the direction of the feed channel to maintain the feed channel and discharge passageway in communication as the nozzle is rotated from a neutral, unrotated position.

31. The die assembly of claim 30, wherein the socket includes feed channels and parallel spaced flow channels for transporting different extrudates to and from the bore; and the nozzle includes parallel spaced discharge passageways disposed in the cylinder for directing different extrudates from the feed channels to the associated flow channel.

32. The die assembly of claim 31, wherein the means for rotating the nozzle includes means for rotating the discharge passageways in unison.

33. The die assembly of claim 31, wherein the means for rotating the nozzle includes means for selectively rotating the discharge passageways.

34. The die assembly of claim 29, wherein the means for transporting extrudate includes a feed channel disposed longitudinally in the cylinder between the discharge passageway and extruder, the discharge passageway and feed channel being at right angles.

35. The die assembly of claim 34, wherein the socket includes parallel spaced flow channels, and the nozzle includes parallel spaced discharge passageways disposed in the cylinder, and feed channels in coaxially spaced relation in the cylinder between the extruders and an associated discharge passageway.

36. The die assembly of claim 35, wherein the means for rotating the nozzle includes means for rotating the discharge passageways, in unison.

37. The die assembly of claim 35, wherein the means for rotating the nozzle includes means for selectively rotating the discharge passageways.

38. The die assembly of claim 15, wherein the first part includes:
(I) a cylindrical bore which extends longitudinally of the first part at right angles to the longitudinal axis of the flow channel; and the second part includes:
(II) an elongated cylinder rotatable in the bore, the cylinder having, (i) a feed channel which extends longitudinally of the cylinder for receiving extrudate from an extruder, and (ii) a discharge passageway which extends transversely of the cylinder in communication with the feed channel and which terminates at a feed opening which communicates with the flow channel in the first part; and the parts mounting means (e) includes:
(III) means mounting the discharge passageway of the second part and the flow channel of the first part for unitary rotation in the same plane and for selective rotation of the discharge passageway in relation to the flow channel.

39. The die assembly of claim 38, wherein the discharge passageway of the second part and the flow channel of the first part are designed to rotate in a horizontal plane.

40. An extruder die assembly for configuring extrudate flow, said assembly comprising,
(a) a feed passage supplying extrudate from an extruder to a feed opening, and having a central feed axis extending longitudinally along said passage,
(b) a die head having a passage in communication with said feed opening and a front surface, and
(c) a continuous extrudate pathway defined by said feed opening and die head passage, and having a central die axis extending longitudinally along said pathway, said die and feed axes being transversely movable with respect to one another upon angular movement of said die head passage or feed opening with respect to the other of said feed opening or die head passage, respectively, to correspondingly configure extrudate exiting the die head.

41. An extruder die assembly for configuring extrudate flow, said assembly comprising,
(a) a nozzle supplying extrudate from an extruder via a longitudinal feed passage extending therethrough and terminating at a feed opening, said feed passage having a central feed axis extending longitudinally thereof,
(b) a die head having a die passage in communication with said feed opening and a front surface,
(c) a die plate mounted on a front surface of said die head and having a die opening therethrough, and
(d) a continuous extrudate pathway defined by said feed opening, die head passage and die opening, and having a central die axis extending longitudinally along said pathway, said die and feed axes being transversely movable with respect to one another upon angular movement of said die opening or feed opening with respect to the other of said feed opening or die opening, respectively, to correspondingly configure extrudate exiting the die opening.

* * * * *